United States Patent Office 3,326,761
Patented June 20, 1967

3,326,761
6-DEMETHYL-6-DEOXYTETRACYCLINE, ANTI-TUMOR ANTIBIOTIC
Robert E. Kent, Newark, N.J., assignor to Chas. Pfizer & Co., Inc., New York, N.Y., a corporation of Delaware
No Drawing. Filed Nov. 16, 1964, Ser. No. 411,595
1 Claim. (Cl. 167—78)

This application is a continuation-in-part of my earlier filed, pending application Ser. No. 111,185, filed May 19, 1961, now abandoned.

This invention relates to a method for inhibiting the growth of tumors and to a composition useful in such treatment. More specifically, it relates to a method for inhibiting malignant tumor growth in animals.

Although the field of cancer therapy has been the subject of intensive study, particularly in recent years, relatively few effective substances have been found which will inhibit or retard the growth of malignant tumors. Any extension of the range of available agents therefore represents a significant contribution to the knowledge of this important subject.

It has now been discovered that the antibiotic compound 6-demethyl-6-deoxytetracycline possesses a clearly demonstrable inhibitory effect on the growth of experimental tumors and particularly on the growth of mammary adenocarcinoma CA–755, Crocker Sarcoma 180 and L–1210 leukemia. For this purpose 6-demethyl-6-deoxytetracycline is used in the form of an acid addition salt, desirably a mineral acid addition salt and preferably the hydrochloride salt. Such salts are more soluble in water than is the free base and permit the use of aqueous solutions of this valuable drug. Furthermore, the acid addition salts, the hydrochloride in particular, provide a convenient and stable form of the drug for the preparation of suspensions and solid formulations.

6-demethyl-6-deoxytetracycline is a known compound, the preparation, chemical and antimicrobial properties of which are described in the literature [Stephens et al., J. Am. Chem. Soc. 80, 5324 (1958)].

This antibiotic, preferably as the hydrochloride salt exhibits pronounced anti-tumor activity against mammary adenocarcinoma CA–755 when tested according to the procedure of Gellhorn et al., Cancer Research, Supplement, No. 3, page 38 (1955) in which treated groups of ten animals each are employed together with untreated controls. Dosage is 0.5 cc. daily to all cases. Therapy is initiated one day after transplantation of the tumor and is continued for 12 days. At the conclusion of the experiment the animals are weighed and sacrificed, and the tumors are excised and weighed. The compound of the present invention is found to demonstrate remarkable efficiency for inhibiting the growth of tumors at tolerated dosages. Furthermore, even where the tumor is permitted to become established by delaying the initiation of treatment for 6 days, retardation of growth is achieved. In addition to intraperitoneal administration, treatment by the oral route is also effective.

Also important is the tumor inhibitory action of 6-demethyl-6-deoxytetracycline against old or established CA–755 tumors. The use of established tumors in test procedures is considered to be a better test than that normally used which employs freshly transplanted tumors. Injections of the test material are normally begun 24 hours after implantation. However, in several tests with 6-demethyl-6-deoxytetracycline, injections were not started until the ninth day after implantation. Effective inhibition of the growth of established tumors is obtained as shown in the appended examples.

It also exhibits activity against Crocker Sarcoma 180 in mice. According to the procedure described by Clarke, Cancer Research, Supplement No. 3, pages 14–17 (1955), the substance under test is dissolved in sterile 0.85% aqueous saline. Small, uniformly cut pieces of 7-day old tumor S–180 are implanted subcutaneously in the axillary region of Swiss white mice weighing 18 to 22 g. Each animal receives an implant, and the animals are divided into groups of six each. Intraperitoneal administration of the solution under test in doses of 0.5 cc. twice daily is begun 24 hours after implantation of the tumor and continued for a total of 13 injections. One animal from each group is maintained as a control and receives injections of 0.85% saline. On the 8th day after tumor implantation the surviving animals are weighed to provide a measure of the toxic effect of the drug. The animals are then sacrificed and the tumors are excised and weighed. The tumor weights for each group are averaged and the averages for the treated animals are expressed as percentages of the averages for the control groups. In this test it is found the compound of the present invention retards tumor growth to a marked degree at tolerable dosage levels.

A regular and statistically important increase in survival time against the growth of a transplantable acute lymphoid leukemia L–1210 is observed when 6-demethyl-6-deoxytetracycline is tested according to the procedure of Law et al., Journal of the National Cancer Institute, 10, 179 (1949). According to this procedure a solution of the drug under study is injected intraperitoneally in the inguinal region of mice 24 to 48 hours after the transplantation of leukemic cells. The injections are continued daily for as long the the animals survive. The increase in survival time of the treated mice beyond that of an equal number of untreated or control mice is taken as a measure of the efficiency of the drug to inhibit the growth of leukemic cells.

In addition to the conventional routes of administration, e.g., intramuscular, intravenous, subcutaneous and intraperitoneal, this compound can also be employed in conjunction with perfusion techniques, wherein the tumor site is islated from the main circulatory system for treatment. Its particular usefulness in this technique is indicated by its effectiveness against tumor cells in tissue cultures. The cytotoxic endpoint (the concentration which effects a 50% or greater removal of cells) and the lethal endpoint (the concentration at or above which, after removal by washing in fresh media, growth no longer occurs) determined as described, by Toplin, Cancer Research, 19, 959 (1959) of this valuable compound is 6 mcg./cc. and 20 mcg./cc., respectively.

Like many carcinostatic agents, this compound is somewhat toxic. However, therapeutic doses can be administered without substantial adverse effect. It has generally been agreed that survival rates of 7/10 in the CA–755 test and 4/6 in the S–180 test represent the minimum acceptable. In the present instance, these criteria are met or exceeded at dosage levels as high as 90 mg. per kg. of body weight with marked retardation of tumor growth.

The present invention embraces all pharmaceutically acceptable salts, including acid addition and metal salts of 6-demethyl-6-deoxytetracycline. These include salts of mineral acids such as hydrochloric, hydriodic, hydrobromic, phosphoric, metaphosphoric, nitric and sulfuric acids, as well as salts of organic acids such as tartaric, acetic citric, malic, benzoic, glycollic, gluconic, gulonic, succinic, arylsulfonic, e.g., p-toluenesulfonic acids, and the like.

The pharmaceutically acceptable metals include more commonly sodium, potassium and alkaline earth metals of atomic number up to and including 20, i.e., magnesium and calcium, and additionally, aluminum, zinc, iron and manganese, among others. Of course, the metal salts include complex salts, i.e., metal chelates, which are well recognized in the tetracycline art.

Various pharmaceutical preparations can be advantageously compounded which contain the active substance along with liquid or solid diluents. Solid preparations for extemporaneous dilution may be formulated employing various buffering agents as well as local anesthetics and other medicinal agents such as antibiotics, hypnotics, analgesics, etc., and inorganic salts to afford desirable pharmacological properties to the composition. Since these active substances are stable and widely compatible, they may be administered in solution or suspension in a variety of phamacologically acceptable vehicles, including water, propylene glycol, diethylcarbonate, glycerol, or oils such as peanut oil or sesame oil.

For oral administration they can be conveniently packed in gelatin capsules, compressed into tablets with sodium chloride, or admixed with, for instance, lactose, potato starch and magnesium stearate and the made into tablets. Alternatively, they can be made into solutions or suspensions in isotonic saline, aqueous glucose, propylene glycol or N,N-dimethylacetamide containing from about 10 mg./ml. to about 400 mg. ml. of the drug. Such liquid compositions are convenient and effective via both oral and parenteral administration.

Daily doses of the order of from about 37 to about 90 mg./kg. of the compounds of the present invention are highly effective in inhibiting tumors in lower animals, and the concentration of the active ingredient in the carrier will usually be at least about 0.1% by weight.

In addition, these valuable active substances may be employed in combination with one or more other carcinostatic agents. For this purpose, compositions containing from 10 to 90% of the compounds of the present invention are useful. Known carcinostatic agents which may be employed in such combinations include the nitrogen mustard type carcinostats, 6-mercaptopurine, 8-azaguanine, urethane, 6-diazo-5-oxo-1-norleucine, azaserine, triethylenemelamine, mitomycin C, triethylenephosphoramide, 1,4-dimethylsulfonyloxybutane, the carcinostatic folic acid analogs and the like.

To illustrate the anti-tumor activity of the present substance, the percent inhibition of CA–755 and S–180 in mice by various forms of 6-deoxy-6-demethyltetracycline is given below. The parenteral route of adminstration, particularly the intraperitoneal route, produces significant retardation of tumor growth.

The following examples are provided by way of illustration, and are not intended to limit this invention, the scope of which is indicated by the appended claims.

EXAMPLE I 6-demethyl-6-deoxytetracycline hydrochloride is tested for effectiveness in inhibiting the growth of mammary adenocarcinoma CA–755 according to the procedure of Gellhorn et al. (loc. cit.). Administration by the intraperitoneal (I.P.) route at the rate of a single treatment of 37.5 mg./kg. of body weight per day for a total of 11 days produces 68% inhibition of tumor growth and a survival rate of 6 out of 7.

EXAMPLE II

The procedure of Example I is repeated. However, in order to determine the effect of 6-demethyl-6-deoxytetracycline upon established CA–755 tumors, injections are not started until the ninth day after implantation. A total of five injections is given. Results are reported below:

| Dosage, Mg./Kg. | Survival Rate | Percent Tumor Inhibition |
|---|---|---|
| 50 | 8/10 | 77 |
| 75 | 10/10 | 48 |

The sulfate and acetate salts of 6-demethyl-6-deoxytetracycline produce substantially the same results when tested in this manner.

EXAMPLE III 6-demethyl-6-deoxytetracycline hydrochloride is evaluated for its effectiveness in treating Sarcoma–180 following the procedure of Clarke (loc. cit.) with the results reported below:

| Dosage, Mg./Kg. | Survival Rate | Percent Tumor Inhibition |
|---|---|---|
| 90 | 6/6 | 95 |
| 90 | 4/7 | 78 |
| 60 | 7/7 | 53 |
| 40 | 6/7 | 68 |
| 75 | 5/6 | 78 |

EXAMPLE IV

A 0.1% solution of 6-demethyl-6-deoxytetracycline hydrochloride is prepared using isotonic saline as the vehicle. This solution is satisfactory for parenteral administration in retarding the growth of malignant tumors.

The sulfate and acetate salts of 6-demethyl-6-deoxytetracycline produce similar solutions.

EXAMPLE V

Suspensions suitable for parenteral administration are prepared using the following quantities of 6-demethyl-6-deoxytetracycline hydrochloride and propylene glycol.

| Grams: | Propylene glycol, ml. |
|---|---|
| 10 | 1000 |
| 50 | 1000 |
| 100 | 1000 |
| 200 | 1000 |
| 400 | 1000 |

Similar suspensions are prepared using the sulfate and acetate salts of 6-demethyl-6-deoxytetracycline.

EXAMPLE VI

The accumulation of 6-demethyl-6-deoxytetracycline in Sarcoma–180 tumor tissue is demonstrated by repetition of the procedure of Example III using albino mice. Intraperitoneal administration at a level of 50 mg./kg./day, for 5 days, of tritiated 6-demethyl-6-deoxyeteracycline retards tumor growth to a market degree as the followingdata on the weights of tumors in control and treated mice shows:

| | Tumor Weights (mg.) | | | | Average |
|---|---|---|---|---|---|
| Control | 350 | 680 | 1,235 | 1,345 | 903 |
| Treated | 295 | 285 | 465 | 225 | 318 |
| Percent Radioactivity in Tumor/gm. tumor | {0.08 <br> {13.6 | 0.25 <br> 43.9 | 1.02 <br> 109.7 | 0.40 <br> 88.9 | 0.44 <br> 64.0 |

It should be noted that the presence of 64γ of the drug per gram of tumor tissue is greater than the in vitro concentration which is lethal to the tumor cells.

What is claimed is:

A process for retarding the growth of malignant tumors selected from the group consisting of mammary adenocarcinoma CA–755, Crocker Sarcoma 180 and L–1210 leukemia, which comprises parenterally administering to a lower animal host bearing said tumor a daily dose of from about 40 to about 90 mg./kg. of body weight of a compound selected from the group consisting of 6-demethyle-6-deoxytetracycline, the pharmaceutically acceptable acid addition and metal salts thereof.

References Cited

UNITED STATES PATENTS 3,036,129   5/1962   Hlavka _____ 167—78

OTHER REFERENCES

Stock et al.: Cancer Research, volume 20, No. 5, Part 2, June 1960, pages 193, 194, 197, 218 (Entry No. 19182).

Suguira: Cancer Research, volume 25, No. 3, part 2, April 1965, pages 494 to 521; relying on pages 494 to 496 and 502 to 505.

ALBERT T. MEYERS, *Primary Examiner.*

JULIAN S. LEVITT, *Examiner.*

JEROME D. GOLDBERG, *Assistant Examiner.*